United States Patent
Hamabe et al.

(10) Patent No.: US 10,118,244 B2
(45) Date of Patent: Nov. 6, 2018

(54) WELD STRUCTURE FOR REFRIGERANT CIRCUIT COMPONENT AND WELDING METHOD FOR REFRIGERANT CIRCUIT COMPONENT

(71) Applicant: Kabushiki Kaisha Saginomiya Seisakusho, Tokyo (JP)

(72) Inventors: Yoshihiro Hamabe, Saitama (JP); Takuro Ishikawa, Saitama (JP)

(73) Assignee: Kabushiki Kaisha Saginomiya Seisakusho, Tokyo (JM)

( * ) Notice: Subject to any disclaimer, the term of this patent is extended or adjusted under 35 U.S.C. 154(b) by 631 days.

(21) Appl. No.: 14/441,039

(22) PCT Filed: Sep. 6, 2013

(86) PCT No.: PCT/JP2013/074105
§ 371 (c)(1),
(2) Date: May 6, 2015

(87) PCT Pub. No.: WO2014/097687
PCT Pub. Date: Jun. 26, 2014

(65) Prior Publication Data
US 2015/0292652 A1    Oct. 15, 2015

(30) Foreign Application Priority Data

Dec. 21, 2012 (JP) .................. 2012-279362

(51) Int. Cl.
*B23K 11/14* (2006.01)
*G01L 19/00* (2006.01)
(Continued)

(52) U.S. Cl.
CPC ............ *B23K 11/14* (2013.01); *G01L 19/003* (2013.01); *G01L 19/0627* (2013.01);
(Continued)

(58) Field of Classification Search
CPC .......................................... B23K 11/14
(Continued)

(56) References Cited

U.S. PATENT DOCUMENTS 2,291,941 A * 8/1942 Bachini ............... F22B 37/104
285/189
2,332,354 A * 10/1943 Stecher ................ F16L 19/041
285/288.5
(Continued)

FOREIGN PATENT DOCUMENTS

CN   202344116 U   7/2012
CN   102639979     8/2012
(Continued)

OTHER PUBLICATIONS

CN Office Action for CN Application No. 201380066388.9 dated Jul. 15, 2016 (7 pages).
(Continued)

*Primary Examiner* — Aaron M Dunwoody
(74) *Attorney, Agent, or Firm* — Reising Ethington P.C.

(57) ABSTRACT

In a refrigerant circuit component or valve device, the present invention projection-welds a connector to a cap member and prevents intrusion of spatter into a refrigerant circuit. A-cylinder section in which an inside hole of the connector is open is inserted in an inside hole formed in the center of the cap member. The area between the A-cylinder section and a projection of the connector is used as a spatter generation space. The projection of the connector abuts against the cap member and is projection-welded to form a welded part. The open end of the inside hole of the A-cylinder section is crimped to pressure-join the open end to the open end of the inside hole of the cap member. Spatter is sealed inside the spatter generation space. A portion of the surface layer to which the generated spatter adheres may be (Continued)

removed by machining to provide a spatter-removed structure.

3 Claims, 13 Drawing Sheets

(51) Int. Cl.
    *G01L 19/06*     (2006.01)
    *F16L 41/08*     (2006.01)
    *B23K 101/06*     (2006.01)
    *B23K 103/04*     (2006.01)
    *B23K 103/22*     (2006.01)

(52) U.S. Cl.
    CPC ...... *B23K 2101/06* (2018.08); *B23K 2103/05* (2018.08); *B23K 2103/22* (2018.08); *F16L 41/082* (2013.01); *F16L 41/084* (2013.01)

(58) Field of Classification Search
    USPC ....... 285/288.1–288.6, 288.11; 219/80, 86.1, 219/91.2, 93
    See application file for complete search history.

(56) References Cited

U.S. PATENT DOCUMENTS

| | | | | |
|---|---|---|---|---|
| 2,968,713 | A * | 1/1961 | Harper | B23K 11/14 219/93 |
| 3,219,790 | A * | 11/1965 | Johnson | B23K 11/14 219/93 |
| 3,698,633 | A | 10/1972 | Lingnau | |
| 4,408,900 | A * | 10/1983 | Takasugi | B23K 1/0004 219/85.1 |
| 6,186,009 | B1 * | 2/2001 | Miyano | G01L 9/06 73/756 |
| 6,298,730 | B1 * | 10/2001 | Yamagishi | G01L 19/0084 73/723 |
| 6,474,170 | B1 * | 11/2002 | Yamagishi | G01L 9/0051 73/723 |
| 6,654,995 | B1 * | 12/2003 | Wang | B21D 39/04 219/93 |
| 6,698,801 | B1 * | 3/2004 | Boecking | F02M 55/005 285/141.1 |
| 6,939,083 | B2 * | 9/2005 | Tosi | B23K 37/0531 285/288.1 |
| 9,718,214 | B2 * | 8/2017 | Baratta | B28D 1/121 |
| 9,816,960 | B2 * | 11/2017 | McCauley | G01N 27/4078 |
| 9,995,409 | B2 * | 6/2018 | Hamabe | F16K 27/10 |
| 2003/0226876 | A1 * | 12/2003 | Stoppek | B23K 11/14 228/124.6 |
| 2008/0149210 | A1 * | 6/2008 | Pionetti | F16L 9/18 138/144 |
| 2010/0187239 | A1 * | 7/2010 | Hoover | B23K 11/14 220/567.3 |
| 2010/0230953 | A1 * | 9/2010 | Baylot | F16L 9/18 285/120.1 |
| 2012/0156561 | A1 * | 6/2012 | Onose | B23K 11/14 429/211 |
| 2014/0261745 | A1 * | 9/2014 | Hayes | F16K 17/04 137/15.18 |
| 2015/0292652 | A1 * | 10/2015 | Hamabe | G01L 19/003 285/288.1 |
| 2015/0354996 | A1 * | 12/2015 | Nelson | G01D 11/245 73/431 |
| 2015/0354997 | A1 * | 12/2015 | McCauley | G01N 27/4078 73/431 |
| 2016/0305567 | A1 * | 10/2016 | Hamabe | B23K 11/002 |

FOREIGN PATENT DOCUMENTS

| | | |
|---|---|---|
| CN | 102713549 | 10/2012 |
| EP | 1582284 A1 | 10/2005 |
| JP | H05200560 | 8/1993 |
| JP | H1122849 | 1/1999 |
| JP | 2004183852 | 7/2004 |
| JP | 2006-205231 | 8/2006 |
| JP | 2014144469 | 8/2014 |

OTHER PUBLICATIONS

Extended EP Search Report for EP Application No. 13863870.5 dated Aug. 4, 2016 (6 pages).

* cited by examiner

WELD STRUCTURE FOR REFRIGERANT CIRCUIT COMPONENT AND WELDING METHOD FOR REFRIGERANT CIRCUIT COMPONENT

TECHNICAL FIELD

The present invention relates to a refrigerant circuit component that is connected to a pipe of a refrigerant circuit. The present invention also relates to a joint structure between a connecting member of a refrigerant circuit component, such as a coupler or a connector, and a casing part when the connecting member is joined to the casing part by projection welding. The present invention also relates to a method for joining the connector of the refrigerant circuit component to the casing part.

BACKGROUND ART

Conventionally, a pressure switch, a pressure sensor or a valve that is connected to a pipe of a refrigerant circuit is known, and examples thereof are disclosed in, for example, Japanese Patent Application Laid-Open Publication No. 2005-205231 (Patent Literature 1; will be mentioned below). For example, such conventional pressure switch has a lid member 1 made from stainless, and a coupling (connector) 2 made from brass. The lid member 1 is diffusion-joined with the coupling 2 by projection welding (resistance welding). The coupling 2 is then connected to the pipe of the refrigerant circuit, and a fluid is introduced into the lid member 1 through an inside hole 22 at the center of the coupling 2 and a through hole 12 of the lid member 1.

This conventional pressure switch also has an outer projection 25 for projection welding and an inner projection 26, which is shorter than the outer projection 25, such that spatter, which is generated upon the projection welding, is prevented from flowing into the refrigerant circuit.

Specifically, the outer projection 25 is melted by the projection welding, and the inner projection 26 is deformed by a pressure-joining force, which clamps and presses the lid member 1 and the coupling 2, such that the space for receiving the spatter is sealed.

LIST OF PRIOR ART REFERENCES

Patent Literatures

PATENT LITERATURE 1: Japanese Patent Application Laid-Open Publication No. 2006-205231

SUMMARY OF THE INVENTION

Problems to be Solved by the Invention

In the pressure switch of Patent Literature 1 (Japanese Patent Application Laid-Open Publication No. 2006-205231), there is a gap between the inner projection 26 and the lid member 1. Thus, there is a problem, i.e., it is not possible to seal the spatter in the spatter receiving space in a reliable manner. It should be noted that if the welding power is too strong, the inner projection 26 is welded, and the resulting spatter travels into the pipe. Therefore, it is difficult to have a sufficient welding width for welding strength while ensuring a gap between the inner projection and the lid member. In other words, there is still a demand for preventing the spatter from flowing into the pipe during the projection welding, when the connecting member is joined to the part of the casing by projection welding. There is still room for improvement.

The present invention was developed to overcome the above-described problems, and an object of the present invention is to provide a refrigerant circuit component that is connected to a pipe of a refrigerant circuit, to join a connecting member, such as a connector or coupler connected to the pipe, to a part of a casing by projection welding, and to prevent spatter generated upon the projection welding from flowing in the pipe.

Solution to the Problems

A first aspect of the present invention provides a joint structure for a refrigerant circuit component. The refrigerant circuit component includes a metallic connecting member and a metallic casing part. The metallic connecting member has an inner hole connected to a pipe of a refrigerant circuit, and the metallic casing part has an inner hole that communicates with the pipe via the inner hole of the connecting member. The casing part is joined to the connecting member by projection welding. A welded portion is formed between the casing part and the connecting member by the projection welding such that the welded portion extends around an entire outer periphery of the inner hole of the casing part with a first gap being left between the welded portion and the inner hole of the casing part, and such that the welded portion extends around an entire outer periphery of the inner hole of the connecting member with a second gap being left between the welded portion and the inner hole of the connecting member. An opening end of one of the casing part and the connecting member around the inner hole thereof is crimped to an opening end of the other of the casing part and the connecting member around the inner hole thereof to pressure-join the opening ends of the casing part and the connecting member and seal a spatter generation space inside the welded portion.

The joint structure for a refrigerant circuit component according to a second aspect of the present invention includes the joint structure of the first aspect, and also includes an A-cylindrical portion that is formed on the connecting member and has the inner hole of the connecting member. The A-cylindrical portion is received in and extends through the inner hole of the casing part. The welded portion is formed around an entire outer periphery of the A-cylindrical portion with a gap being left between the welded portion and the A-cylindrical portion. The opening end of the A-cylindrical portion is crimped outward such that the opening end of the A-cylindrical portion is pressure-joined to the opening end of the casing part around the inner hole thereof.

The joint structure for a refrigerant circuit component according to a third aspect of the present invention includes the joint structure of the second aspect, and also includes an annular convex portion that is formed on the connecting member around the A-cylindrical portion with a gap being left between the annular convex portion and the A-cylindrical portion. The welded portion is formed at an end of the convex portion, and the spatter generation space is defined between the A-cylindrical portion and the convex portion.

The joint structure for a refrigerant circuit component according to a fourth aspect of the present invention includes the joint structure of the second aspect, and also includes a B-cylindrical portion that is formed on the casing part and has the inner hole of the casing part. The A-cylindrical portion is received in and extends through the inner hole of the B-cylindrical portion. The welded portion is formed at an end of the B-cylindrical portion. The spatter generation space is defined between the A-cylindrical portion and the B-cylindrical portion.

The joint structure for a refrigerant circuit component according to a fifth aspect of the present invention includes the joint structure of the first aspect, and also includes a C-cylindrical portion that is formed on the casing part and has the inner hole of the casing part. The C-cylindrical portion is received in and extends through the inner hole of the connecting member. An annular convex portion is formed on the connecting member around the C-cylindrical portion with a gap being left between the annular convex portion and the C-cylindrical portion. The welded portion is formed at an end of the convex portion. The opening end of the C-cylindrical portion of the casing part is crimped outward such that the opening end of the C-cylindrical portion is pressure-joined to the opening end of the connecting member around the inner hole thereof.

The joint structure for a refrigerant circuit component according to a sixth aspect of the present invention includes the joint structure of the first aspect, and also includes an annular convex portion that is formed on the connecting member around the inner hole of the connecting member with a gap being left between the annular convex portion and the inner hole of the connecting member. The welded portion is formed at an end of the convex portion. The opening end of the casing part is crimped to the opening end of the connecting member such that the opening end of the casing part is pressure-joined to the opening end of the connecting member around the inner hole thereof.

A seventh aspect of the present invention provides another joint structure for a refrigerant circuit component. The joint structure includes a metallic connecting member and a metallic casing part, which are joined to each other by projection welding. The metallic connecting member has an inner hole connected to a pipe of a refrigerant circuit. The metallic casing part has an inner hole that communicates with the pipe via the inner hole of the connecting member. A welded portion is formed between the casing part and the connecting member by the projection welding such that the welded portion extends around an entire outer periphery of the inner hole of the casing part with a first gap being left between the welded portion and the inner hole of the casing part, and such that the welded portion extends around an entire outer periphery of the inner hole of the connecting member with a second gap being left between the welded portion and the inner hole of the connecting member. A surface layer of the inner hole of the casing part and the connecting member is partially removed to provide a spatter-removed structure.

The joint structure for a refrigerant circuit component according to an eighth aspect of the present invention includes the joint structure of the seventh aspect, and the spatter-removed structure is formed by cutting.

The joint structure for a refrigerant circuit component according to a ninth aspect of the present invention includes the joint structure of the seventh aspect, and the spatter-removed structure is formed by press working.

The joint structure for a refrigerant circuit component according to a tenth aspect of the present invention includes the joint structure of the seventh aspect, and the spatter-removed structure is formed by polishing.

The joint structure for a refrigerant circuit component according to an eleventh aspect of the present invention includes the joint structure of the seventh aspect, and the spatter-removed structure is formed by laser trimming.

The joint structure for a refrigerant circuit component according to a twelfth aspect of the present invention includes the joint structure of any one of the first to eleventh aspects, with the connecting member being a copper-based member, and the casing part being a stainless part.

The joint structure for a refrigerant circuit component according to a thirteenth aspect of the present invention includes the joint structure of any one of the first to twelfth aspects. The casing part is a metallic cap member that defines a pressure chamber into which a fluid (target for pressure sensing) is introduced. The connecting member is a coupler or connector that communicates with the pressure chamber of the cap member. The refrigerant circuit component is a pressure sensitive device having the cap member and the connector.

The joint structure for a refrigerant circuit component according to a fourteenth aspect of the present invention includes the joint structure of any one of the first to twelfth aspects. The casing part is part of the casing connected to the pipe via the connecting member, the connecting member is a housing having a valve chamber, the refrigerant circuit component includes a valve device having the casing part and the housing.

A fifteenth aspect of the present invention provides a joining method for use with a refrigerant circuit component. The refrigerant circuit component includes a connecting member and a casing part, which are joined to each other by projection welding. The connecting member has an inner hole connected to a pipe of a refrigerant circuit, and the casing part has an inner hole that communicates with the pipe via the inner hole of the connecting member. The joining method includes joining the casing part with the connecting member by the projection welding such that the welded portion extends around an entire outer periphery of the inner hole of the casing part with a first gap being left between the welded portion and the inner hole of the casing part, and such that the welded portion extends around an entire outer periphery of the inner hole of the connecting member with a second gap being left between the welded portion and the inner hole of the connecting member. The method also includes crimping an opening end of one of the casing part and the connecting member around the inner hole thereof to an opening end of the other of the casing part and the connecting member around the inner hole thereof to pressure-join the opening ends of the casing part and the connecting member and seal a spatter generation space inside the welded portion.

A sixteenth aspect of the present invention provides another joining method for use with a refrigerant circuit component. The refrigerant circuit component includes a connecting member and a casing part, which are joined to each other by projection welding. The connecting member has an inner hole connected to a pipe of a refrigerant circuit, and the casing part has an inner hole that communicates with the pipe via the inner hole of the connecting member. The joining method includes joining the casing part with the connecting member by projection welding such that the welded portion extends around an entire outer periphery of the inner hole of the casing part with a first gap being left between the welded portion and the inner hole of the casing part, and such that the welded portion extends around an entire outer periphery of the inner hole of the connecting member with a second gap being left between the welded portion and the inner hole of the connecting member. The method also includes partially removing a surface layer of the casing part and the inner hole of the connecting member.

Advantages of the Invention

According to the joint structure for the refrigerant circuit component of the first aspect, the spatter generated upon the projection welding is sealed in the spatter generating space. Thus, it is possible to prevent the spatter from flowing into the piping of the refrigerant circuit.

Similar to the first aspect, the joint structure for the refrigerant circuit component according to the second aspect can prevent the spatter from flowing into the pipe of the refrigerant circuit. In addition, even if a force is applied to separate the connecting member from the casing part at the welded portion, the crimped portion exerts a resisting force. Thus, the rigidity of the welded portion is enhanced.

Similar to the first aspect, the joint structure for the refrigerant circuit component according to the third aspect can prevent the spatter from flowing into the pipe of the refrigerant circuit. In addition, even if a force is applied to separate the connecting member from the casing part at the welded portion, the crimped portion exerts a resisting force. Thus, the rigidity of the welded portion is enhanced.

Similar to the first aspect, the joint structure for the refrigerant circuit component according to the fourth aspect can prevent the spatter from flowing into the pipe of the refrigerant circuit.

Similar to the first aspect, the joint structure for the refrigerant circuit component according to the fifth aspect can prevent the spatter from flowing into the pipe of the refrigerant circuit.

Similar to the first aspect, the joint structure for the refrigerant circuit component according to the sixth aspect can prevent the spatter from flowing into the pipe of the refrigerant circuit.

The joint structure for the refrigerant circuit component according to the seventh aspect has the spatter-removed structure that has removed the spatter, which is generated inside the connecting member and the casing part during the projection welding. Therefore, it is possible to prevent the spatter from flowing in the pipe of the refrigerant circuit.

Similar to the seventh aspect, the joint structure for the refrigerant circuit component according to the eighth aspect can prevent the spatter from flowing into the pipe of the refrigerant circuit.

Similar to the seventh aspect, the joint structure for the refrigerant circuit component according to the ninth aspect can prevent the spatter from flowing into the pipe of the refrigerant circuit.

Similar to the seventh aspect, the joint structure for the refrigerant circuit component according to the tenth aspect can prevent the spatter from flowing into the pipe of the refrigerant circuit.

Similar to the seventh aspect, the joint structure for the refrigerant circuit component according to the eleventh aspect can prevent the spatter from flowing into the pipe of the refrigerant circuit.

According to the joint structure for the refrigerant circuit component according to the twelfth aspect, the welding can be easy and can be carried out without considering the spatter when a copper-based member is joined to a stainless member by projection welding. Also, similar to the first to seventh aspects, it is possible to prevent the spatter from flowing into the pipe of the refrigerant circuit.

The joint structure for the refrigerant circuit component according to the thirteenth aspect can avoid an adverse effect of the spatter on a pressure sensitive device itself. Also, similar to the first to seventh aspects, it is possible to prevent the spatter from flowing into the pipe of the refrigerant circuit.

The joint structure for the refrigerant circuit component according to the fourteenth aspect can avoid an adverse effect of the spatter on a valve device itself. Also, similar to the first to seventh aspects, it is possible to prevent the spatter from flowing into the pipe of the refrigerant circuit.

According to the joining method for the refrigerant circuit component according to the fifteenth aspect, the structure of the first aspect is obtained. As a result, similar to the first aspect, it is possible to prevent the spatter from flowing into the pipe of the refrigerant circuit.

According to the joining method for the refrigerant circuit component according to the sixteenth aspect, the structure of the seventh aspect is obtained. As a result, similar to the seventh aspect, it is possible to prevent the spatter from flowing into the pipe of the refrigerant circuit.

MODE FOR CARRYING OUT THE INVENTION

Figure 1:
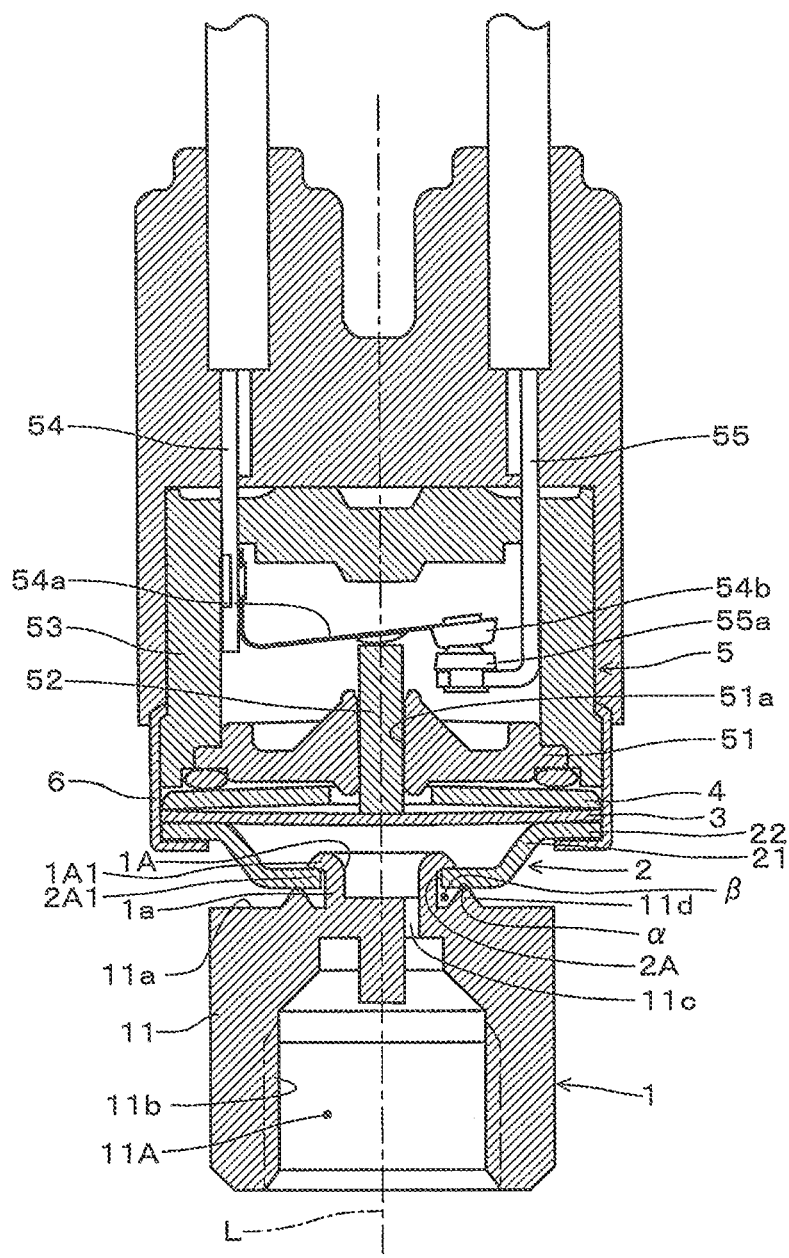
FIG. 1 is a vertical cross-sectional view of a pressure sensor according to one embodiment of the present invention.
Figure 2A:
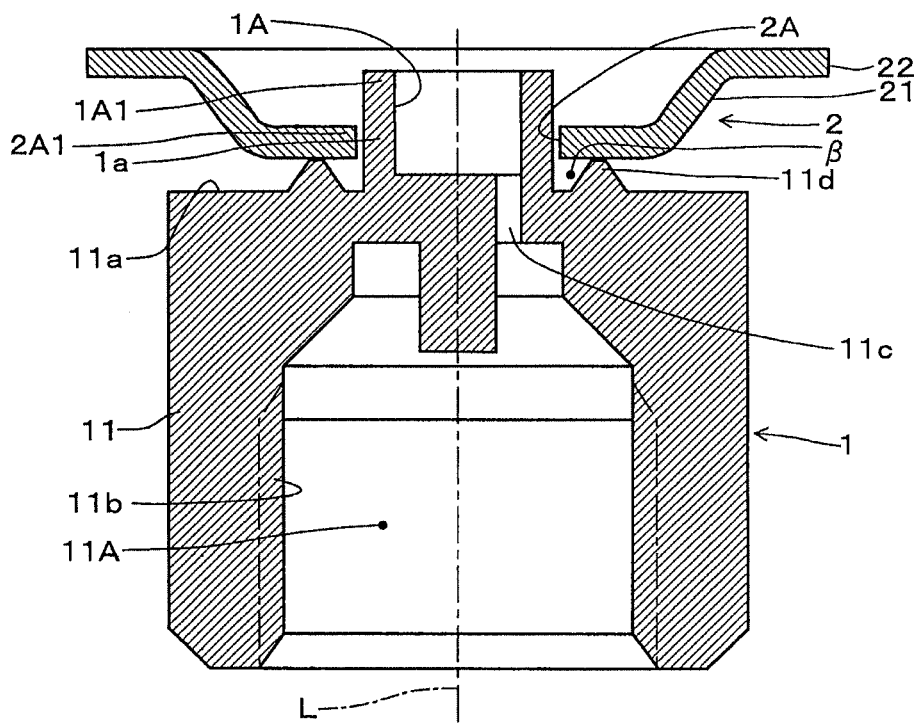
FIG. 2A is a view illustrating a process for joining a connector of the pressure switch to a cap member according to a first embodiment.
Figure 2B:
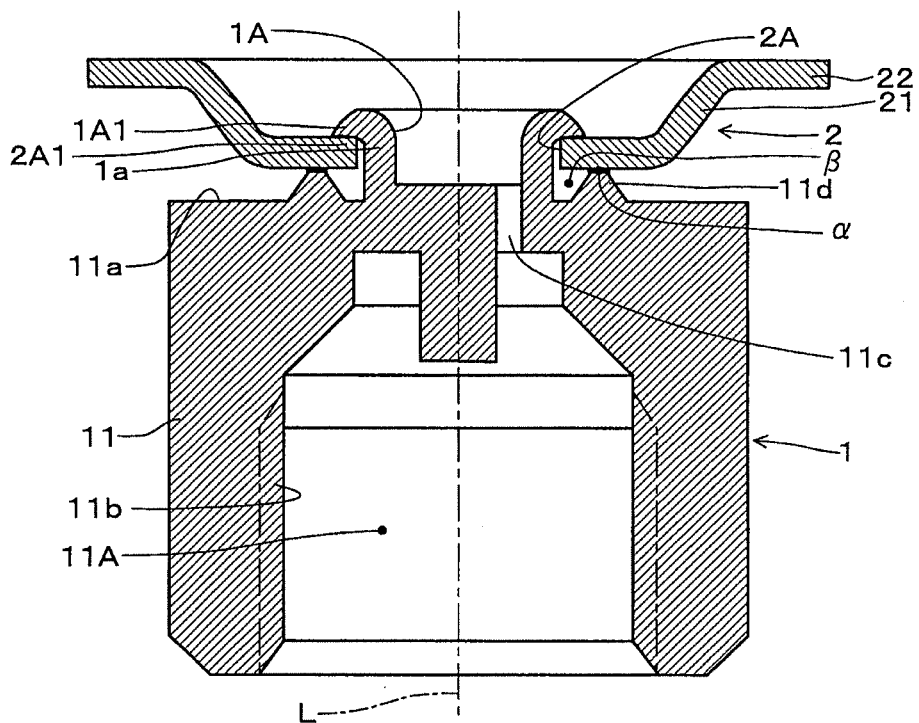
FIG. 2B is a view illustrating a process for joining a connector of the pressure switch to a cap member according to a first embodiment.

Embodiments according to the present invention will now be described with reference to the accompanying drawings. FIG. 1 is a vertical cross-sectional view of a pressure sensor according to one embodiment of the present invention, which is one example of "refrigerant circuit component" to which the present invention is applied. FIGS. 2A and 2B are a set of views illustrating a process for joining a connector of the pressure switch to a cap member according to a first embodiment. The pressure switch is an example of "pressure sensitive device," and includes a connector 1, a cap member 2, a circular plate 3, a stopper 4, a switch part 5, and an outer cover 6. The connector 1 is made from brass. The connector 1 is a "connecting member" or the "copper-based member," which is connected to a pipe in which a fluid flows. The fluid is a detection target. The cap member 2 is made from stainless, and it is a "casing part." The outer cover 6 is made from a stainless thin plate. The connector 1 is joined to the cap member 2 by projection welding and crimping as described below. In each of the following embodiments, the welded portion and the crimped portion as well as their vicinity are rotation-symmetrical about an axial line L at an arbitrary angle about the rotating axis L.

The switch part 5 includes a guide 51, which has an axial bore 51a at its center, a shaft 52 received in the axial bore 51a of the guide 51, and a cylindrical terminal base 53, which fits around the guide 51. The outer peripheries of the cap member 2, the circular plate 3 and the stopper 4 are fixedly secured, by means of crimping, to the end of the terminal base 53 by the outer cover 6. A first terminal 54 and a second terminal 55 are fixed to the terminal base 53. A contact plate 54a is attached to the first terminal 54. A first contact 54b is mounted on the contact plate 54a, and a second contact 55a is mounted on the second terminal 55.

With the above-described configuration, a fluid is introduced to a pressure chamber of the cap member 2 via the connector 1, the circular plate 3 deforms in accordance with the pressure of the fluid, and the shaft 52 is pushed. When the pressure reaches a preset value, the first contact 54b, which moves with the shaft 52, leaves the second contact 55a, and the switch is turned off. Accordingly, it is possible to detect that the pressure of the fluid reaches the preset value.

FIG. 2A shows the connector 1 and the cap member 2 before welding. FIG. 2B shows the connector 1 and the cap member 2 after welding and crimping. The connector 1 has a main body 11, and the main body 11 has a flat portion 11a that faces the cap member 2. A female thread 11b is formed in the main body 11 such that the main body 11 is threadedly engaged with a pipe (not shown). An A-cylindrical portion 1a having a cylindrical shape stands from the flat portion 11a. The axial line L extends through the center of the A-cylindrical portion 1a. An inner hole 1A is open at the center of the A-cylindrical portion 1a. The inner hole 1A communicates with a screw chamber 11A of the main body 11 through a connecting passage 11c. A projection 11d also stands from the flat portion 11a of the connector 1. The axial line L extends through the center of the projection 11d. The projection 11d is a "convex portion," and has an annular mountain-like shape. The projection 11d is formed at a position spaced from the A-cylindrical portion 1a. A spatter generation space β is defined between the projection 11d and the A-cylindrical portion 1a.

The cap member 2 has a bowl-shaped portion 21 and an annular flange portion 22 around the bowl-shaped portion 21. An inner hole 2A opens at the center of the bowl-shaped portion 21. The A-cylindrical portion 1a of the connector 1 is received in and extends through the inner hole 2A of the cap member 2 such that a gap is left between the A-cylindrical portion 1a and the inner hole 2A. The connector 1 is welded to the cap member 2 at the projection 11d by projection welding. As shown in FIG. 2B, the projection welding creates a welded portion α between the projection 11d and the cap member 2. As such, the welded portion α has an annular shape about the axial line L, and extends around the entire outer periphery of the inner hole 2A of the cap member 2 with a certain distance from the inner hole 2A. Also, the welded portion α extends around the entire outer periphery of the inner hole 1A of the connector 1 with a certain distance from the inner hole 1A. A load is applied on the opening end 1A1 of the inner hole 1A of the A-cylindrical portion 1a outward relative to the axial line L, and the opening end 1A1 is crimped over the opening end 2A1 of the cap member around the inner hole 2A. Thus, the opening end 1A1 of the A-cylindrical portion a is pressure-joined to the opening end 2A1 of the cap member 2 around the inner hole 2A.

Spatter is generated when the connector 1 is projection-welded to the cap member 2. The generated spatter is retained in the spatter generation space β, and sealed in the spatter generating space β as the opening end 1A1 of the A-cylindrical portion 1a is crimped. Therefore, the spatter does not enter the refrigerating circuit when the refrigerating circuit is actually operated, with the pressure switch being connected to the pipe of the refrigerating circuit.

Figure 3A:
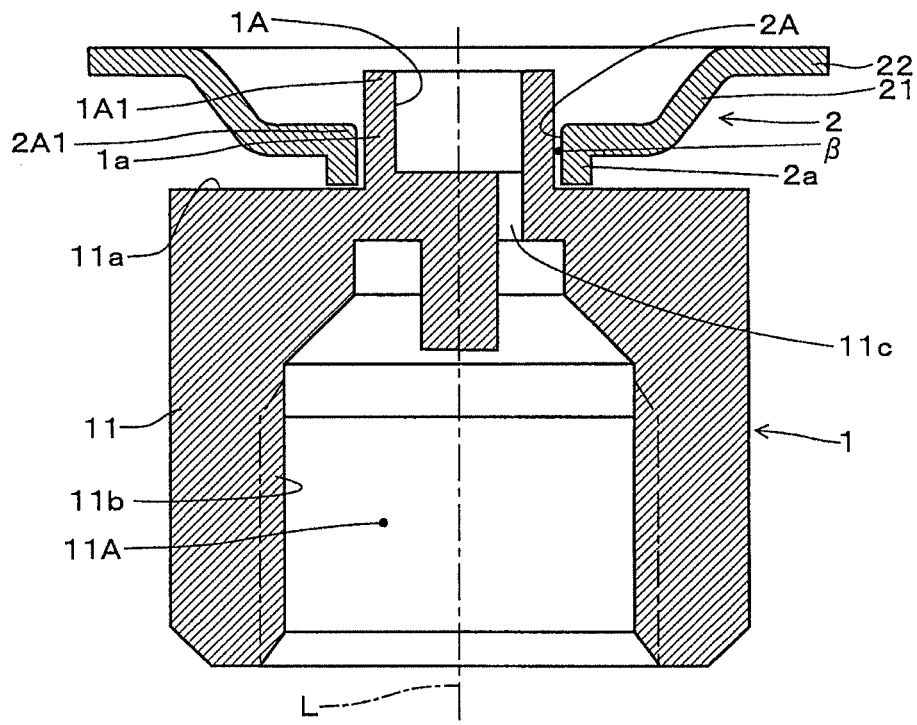
FIG. 3A is a view illustrating a process for joining the connector of the pressure switch to the cap member according to a second embodiment.
Figure 3B:
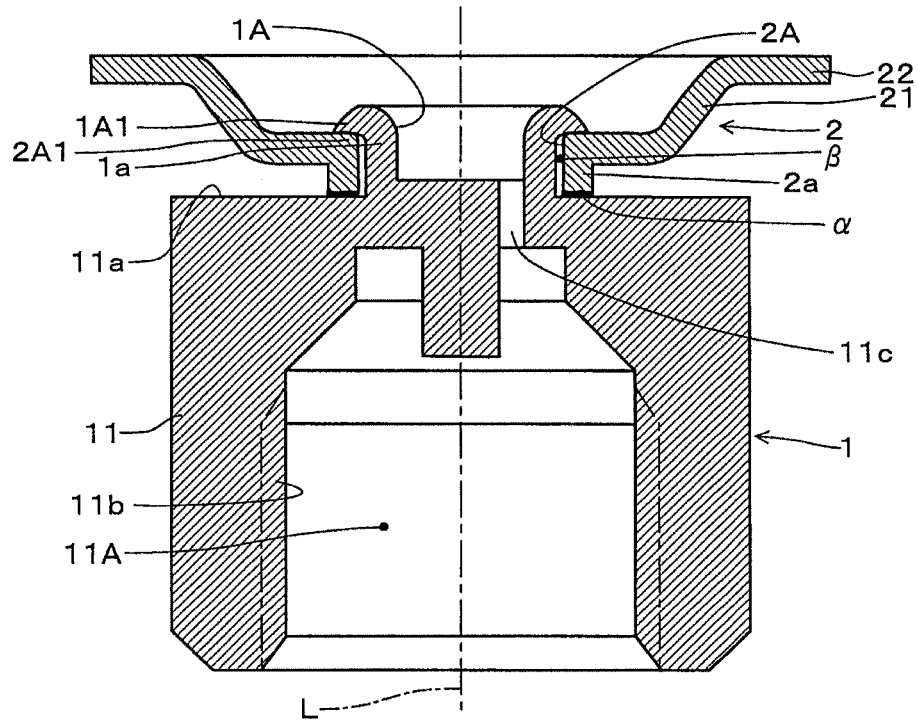
FIG. 3B is a view illustrating a process for joining the connector of the pressure switch to the cap member according to a second embodiment.

FIGS. 3A and 3B are a set of views illustrating a process for joining the connector 1 to the cap member 2 according to a second embodiment. In each of the following embodiments, similar elements and parts to the first embodiment are assigned same reference numerals and symbols as the first embodiment, and detailed description of such elements and parts is omitted. In each of the following embodiments, the connector and the cap member are constituent elements of the pressure switch shown in FIG. 1.

In the second embodiment, as illustrated in FIGS. 3A and 3B, the bowl-shaped portion 21 of the cap member 2 includes a B-cylindrical portion 2a that has a cylindrical shape. The axial line L extends through the center of the B-cylindrical portion 2a. An inner hole 2A is open at the center of the B-cylindrical portion 2a. The A-cylindrical portion 1a of the connector 1 extends through the inner hole 2A of the B-cylindrical portion 2a of the cap member 2, with a gap being left between the A-cylindrical portion 1a and the B-cylindrical portion 2a. As shown in FIG. 3B, the main body 11 is joined to the B-cylindrical portion 2a by projection welding at the position where the end face of the B-cylindrical portion 2a of the cap member 2 abuts on the flat portion 11a of the connector 1. As such, a welded portion α is formed between the main body 11 and the B-cylindrical portion 2a.

A load is applied on the opening end 1A1 of the inner hole 1A of the A-cylindrical portion 1a outward relative to the axial line L, and the opening end 1A1 is crimped over the opening end 2A1 of the cap member around the inner hole 2A. Thus, the opening end 1A1 of the A-cylindrical portion 1a is pressure-joined to the opening end 2A1 of the cap member 2 around the inner hole 2A. The A-cylindrical portion 1a is slightly spaced from the B-cylindrical portion 2a, except for the crimped portion. The spatter generation space β is defined between the A-cylindrical portion 1a and the B-cylindrical portion 2a.

In the second embodiment, the spatter generated upon the projection welding is retained in the spatter generation space β, and sealed in the spatter generating space β as the opening end 1A1 of the A-cylindrical portion 1a is crimped. Therefore, the spatter does not enter the refrigerating circuit when the refrigerating circuit is actually operated, with the pressure switch being connected to the pipe of the refrigerating circuit.

Figure 4A:
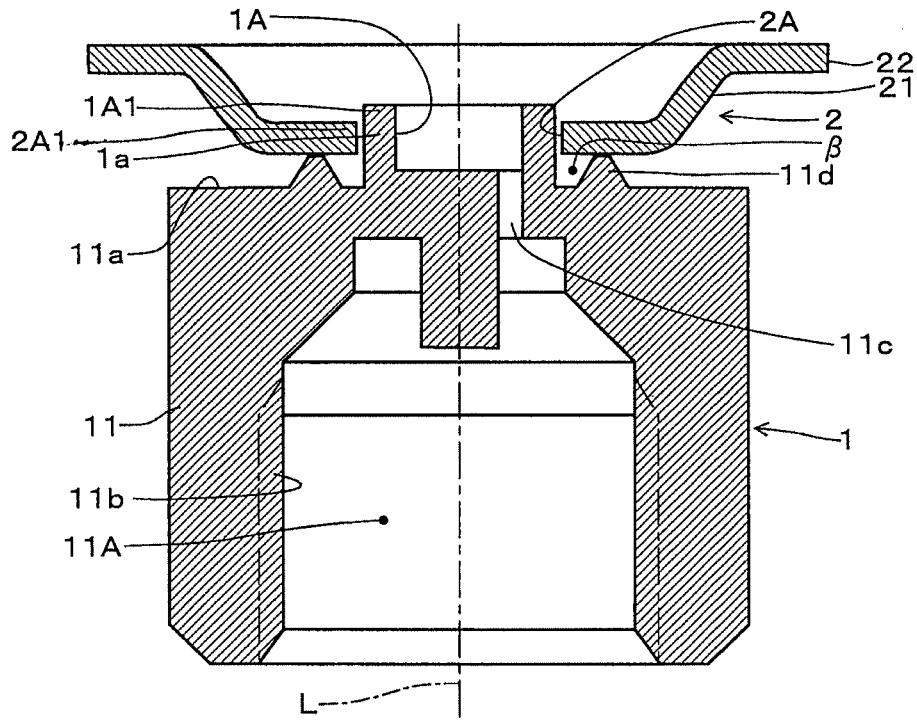
FIG. 4A is a view illustrating a process for joining the connector of the pressure switch to the cap member according to a third embodiment.
Figure 4B:
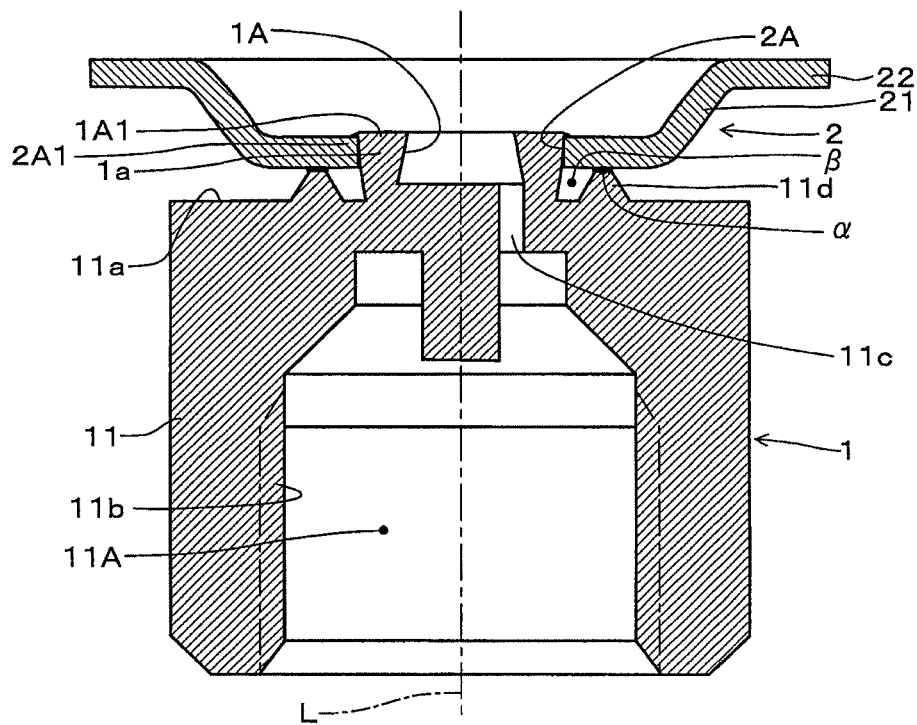
FIG. 4B is a view illustrating a process for joining the connector of the pressure switch to the cap member according to a third embodiment.

FIGS. 4A and 4B are a set of views illustrating a process for joining the connector 1 to the cap member 2 according to a third embodiment. In the third embodiment, the projection 11a is formed on the flat portion 11a of the connector 1. The projection 11a has an annular mountain-like shape, and the axial line L extends through the center of the projection 11a. The projection 11a is a "convex portion." The spatter generation space β is defined between the projection 11d and the A-cylindrical portion 1a. The projection 11d is formed around the A-cylinder portion 1a at a position spaced from the A-cylindrical portion 1a. The A-cylinder portion 1a of the third embodiment is shorter than the A-cylinder portion of the second embodiment.

The A-cylinder portion 1a is received in and extends through the inner hole 2A of the cap member 2, and the projection 11d of the connector 1 is joined to the cap member 2 by projection welding. Thus, a welded portion α is formed between the projection 11d and the cap member 2. A load is applied on the opening end 1A1 of the inner hole 1A of the A-cylindrical portion 1a in the axial line L to crimp the opening end 1A1. Thus, the opening end 1A1 of the A-cylindrical portion 1a is pressure-joined to the opening end 2A1 of the cap member 2 around the inner hole 2A.

In the third embodiment, the spatter generated upon the projection welding is retained in the spatter generation space β, and sealed in the spatter generating space β as the opening end 1A1 of the A-cylindrical portion 1a is crimped. Therefore, the spatter does not enter the refrigerating circuit when the refrigerating circuit is actually operated, with the pressure switch being connected to the pipe of the refrigerating circuit.

Figure 5A:
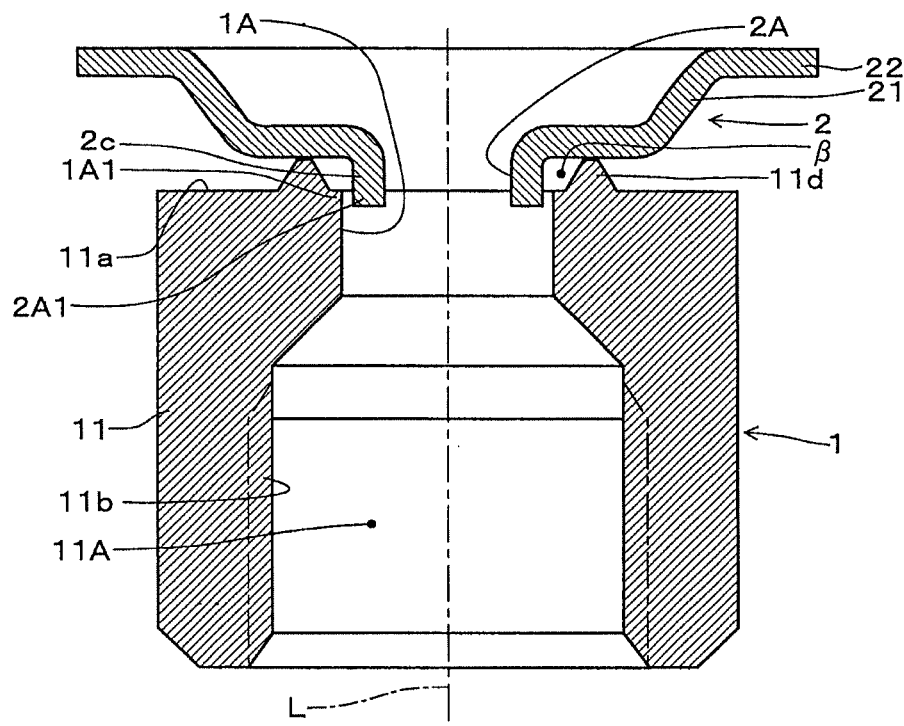
FIG. 5A is a view illustrating a process for joining the connector of the pressure switch to the cap member according to a fourth embodiment.
Figure 5B:
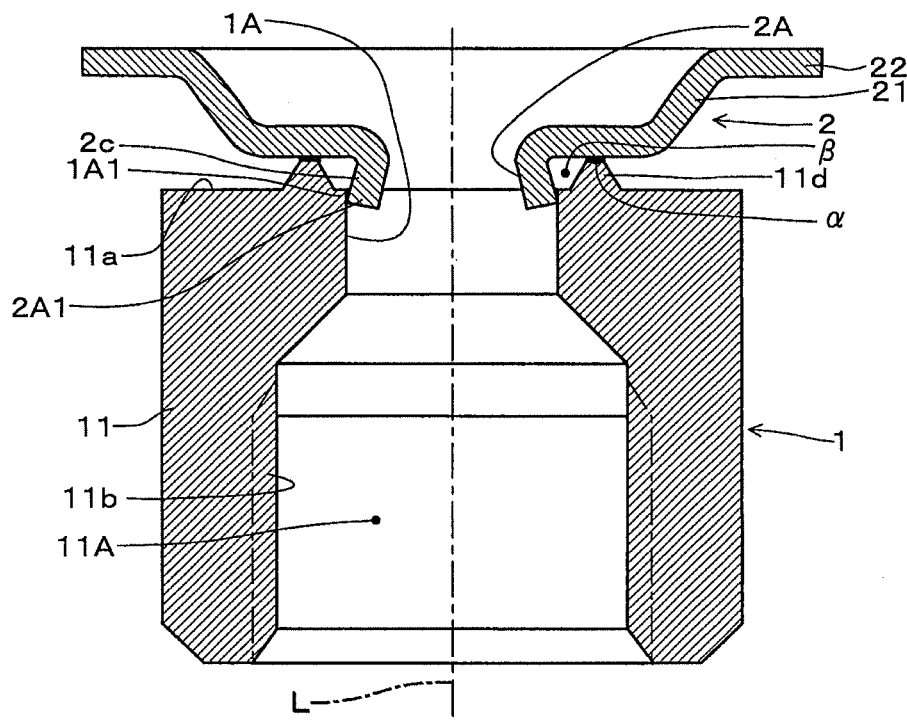
FIG. 5B is a view illustrating a process for joining the connector of the pressure switch to the cap member according to a fourth embodiment.

FIGS. 5A and 5B are a set of views illustrating a process for joining the connector 1 to the cap member 2 according to a fourth embodiment. In the fourth embodiment, the cap member 2 has a C-cylindrical portion 2c that defines the inner hole 2A. The C-cylindrical portion 2c is received in the inner hole 1A of the connector 1. The projection 11d is formed on the flat portion 11a of the connector 1. The projection 11d has an annular mountain-like shape, and the axial line L extends through the center of the projection 11d. The projection 11d is a "convex portion." The projection 11d is formed around the C-cylinder portion 2c at a position spaced from the C-cylindrical portion 2c. The welded portion α is formed at the end of the projection 11d. The opening end 2A1 of the inner hole 2A of the C-cylindrical portion 2c of the cap member 2 is crimped outward relative to the axial line L such that the opening end 2A1 of the C-cylindrical portion 2c is pressure-joined to the opening end 1A1 of the connector 1 around the inner hole 1A.

In the fourth embodiment, the spatter generated upon the projection welding is retained in the spatter generation space β, and sealed in the spatter generating space β as the opening end 2A1 of the C-cylindrical portion 2c is crimped. Therefore, the spatter does not enter the refrigerating circuit when the refrigerating circuit is actually operated, with the pressure switch being connected to the pipe of the refrigerating circuit.

Figure 6A:
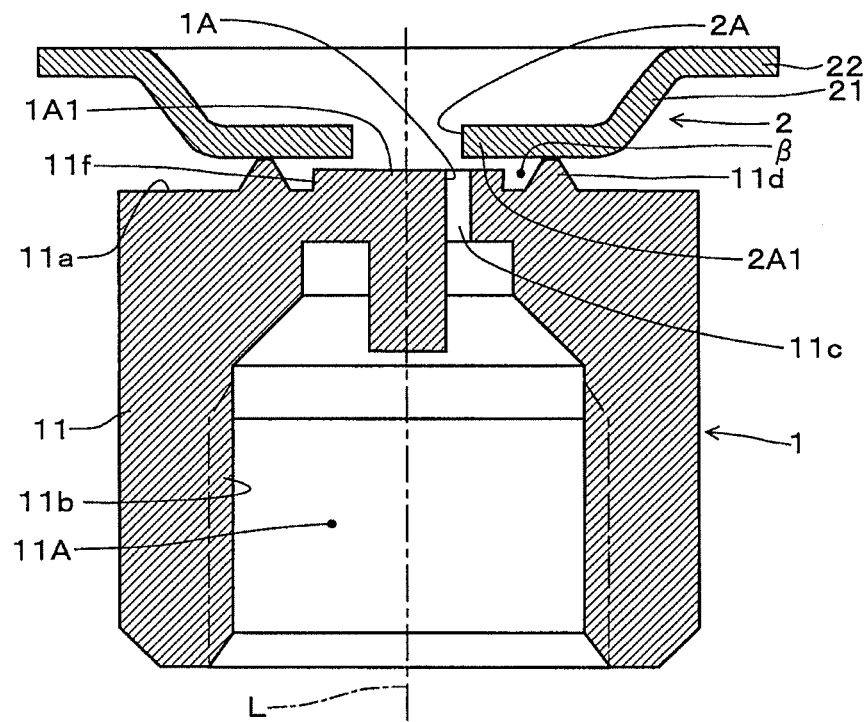
FIG. 6A is a view illustrating a process for joining the connector of the pressure switch to the cap member according to a fifth embodiment.
Figure 6B:
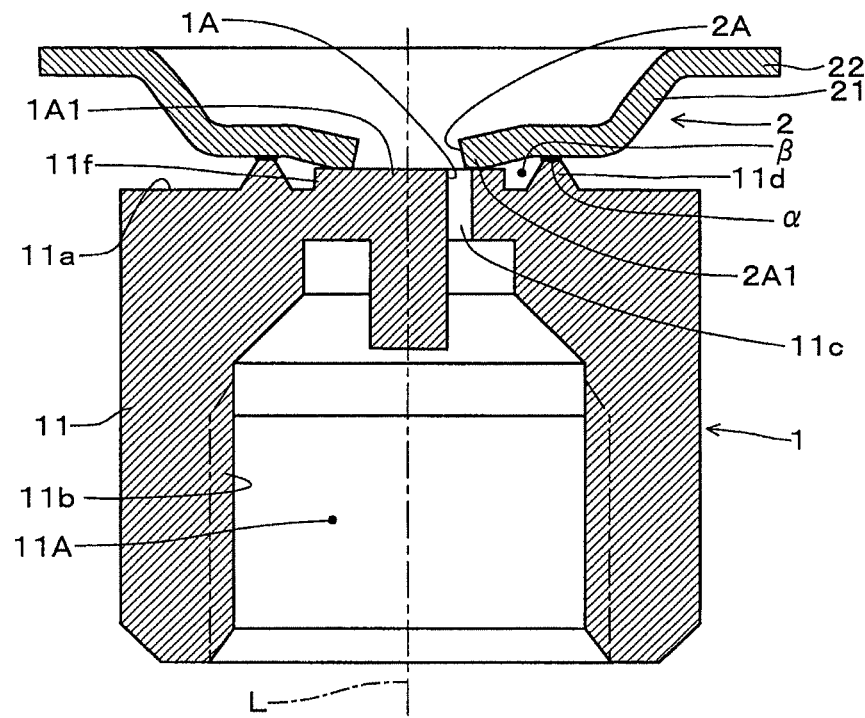
FIG. 6B is a view illustrating a process for joining the connector of the pressure switch to the cap member according to a fifth embodiment.

FIGS. 6A and 6B are a set of views illustrating a process for joining the connector 1 to the cap member 2 according to a fifth embodiment. In the fifth embodiment, a seat 11f is formed inward of the projection 11d of the flat portion 11a of the connector 1. The seat 11f has an inner hole 1A, and the end of the seat 11f on the cap member 2 side has the opening end 1A1 of the inner hole 1A. The spatter generation space β is defined between the projection 11d and the seat 11f. The opening end 2A1 of the inner hole 2A of the cap member 2 faces the opening end 1A1. The welded portion α is formed at the end of the projection 11d. The opening end 2A1 of the cap member 2 is crimped toward the opening end 1A1 of the connector 1 such that opening end 2A1 of the cap member 2 is pressure-joined to the opening edge 1A1 of the connector 1 around the inner hole 1A.

In the fifth embodiment, the spatter generated upon the projection welding is retained in the spatter generation space β, and sealed in the spatter generating space β as the opening end 2A1 of the cap member 2 is crimped. Therefore, the spatter does not enter the refrigerating circuit when the refrigerating circuit is actually operated, with the pressure switch being connected to the pipe of the refrigerating circuit.

Figure 7A:
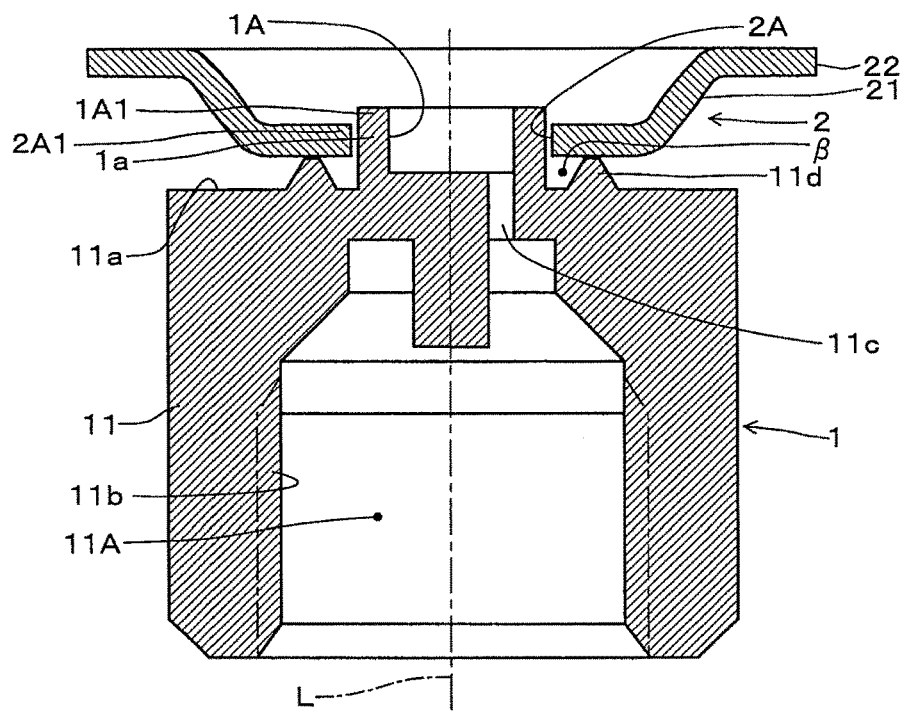
FIG. 7A is a view illustrating a process for joining the connector of the pressure switch to the cap member according to a sixth embodiment.
Figure 7B:
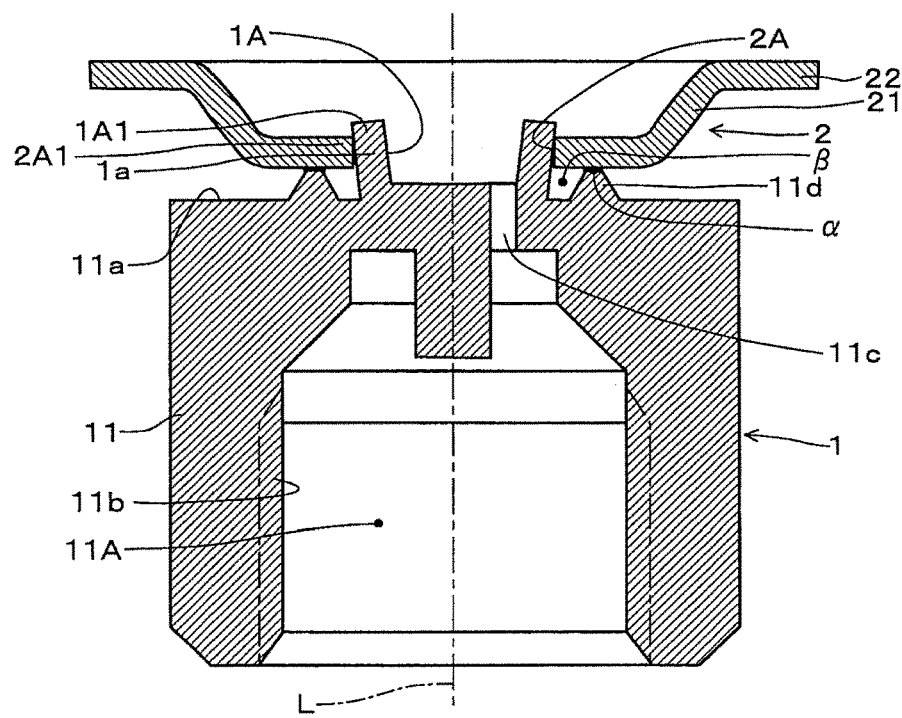
FIG. 7B is a view illustrating a process for joining the connector of the pressure switch to the cap member according to a sixth embodiment.

FIGS. 7A and 7B are a set of views illustrating a process for joining the connector 1 to the cap member 2 according to a sixth embodiment. Similar to the third embodiment (FIGS. 4A and 4B), the projection 11d is formed on the flat portion 11a of the connector 1 in the sixth embodiment. The A-cylindrical portion 1a is formed inward of the projection 11d, and the spatter generation space β is defined between the projection 11d and the A-cylindrical portion 1a.

The A-cylindrical portion 1a is received in and extends through the inner hole 2A of the cap member 2, and the projection 11d of the connector 1 is joined to the cap member 2 by projection welding. As such, the welded portion α is formed between the projection 11d and the cap member 2. A load is applied on the opening end 1A1 of the A-cylindrical portion 1a outward relative to the axial line L to crimp the opening end 1A1. Thus, the opening end 1A1 of the A-cylindrical portion 1a is pressure-joined to the opening edge 2A1 of the cap member 2 around the inner hole 2A.

In the sixth embodiment, the spatter generated upon the projection welding is retained in the spatter generation space β, and sealed in the spatter generating space β upon crimping of the opening end 1A1 of the A-cylindrical portion 1a. Therefore, the spatter does not enter the refrigerating circuit when the refrigerating circuit is actually operated, with the pressure switch being connected to the pipe of the refrigerating circuit.

Figure 8:
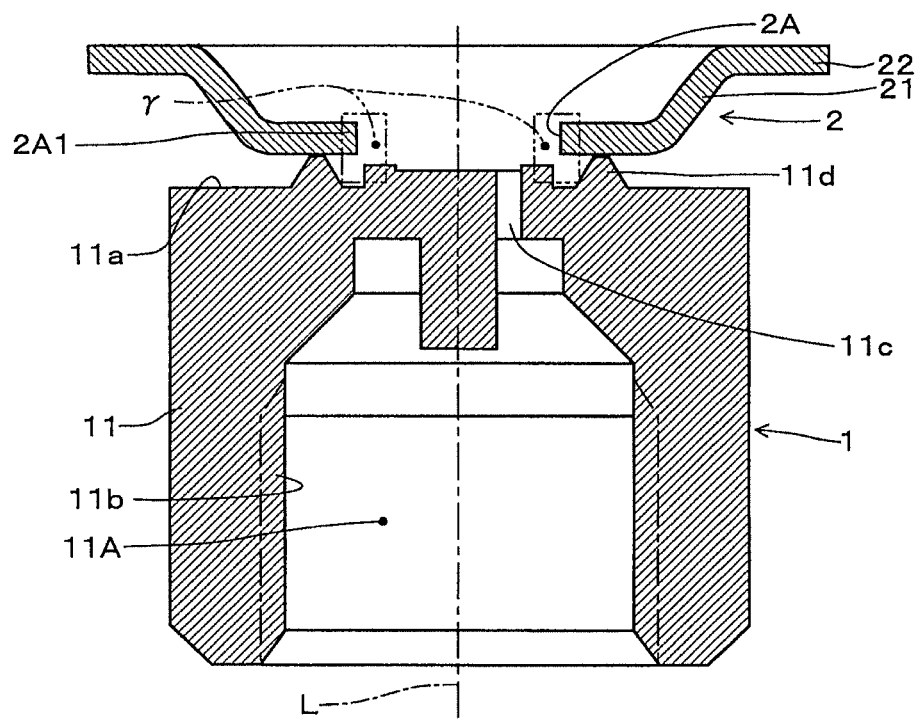
FIG. 8 illustrates the connector and the cap member before welding according to a seventh embodiment.
Figure 9:
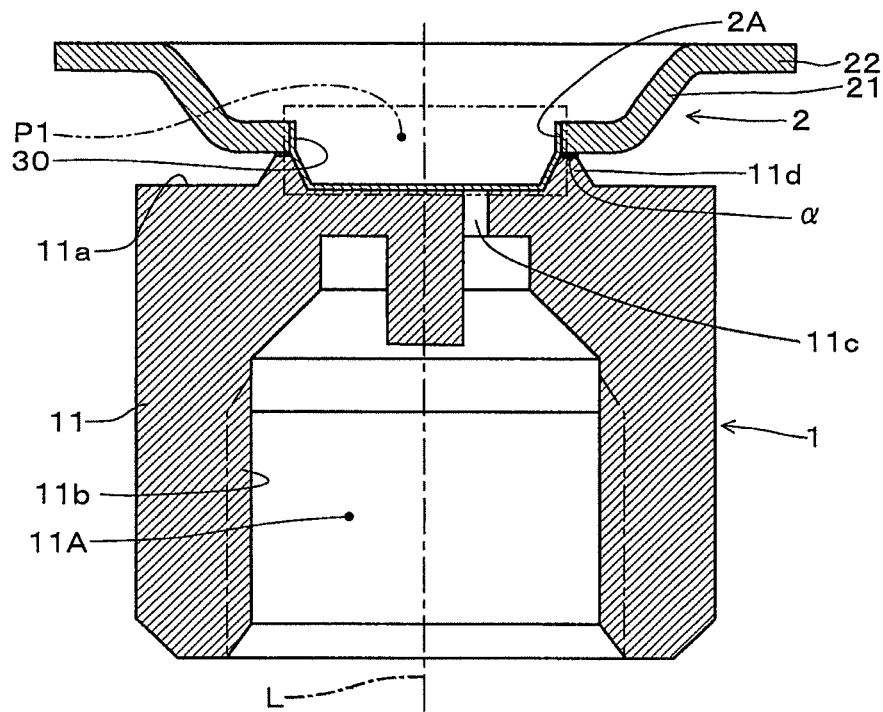
FIG. 9 illustrates the connector and the cap member after welding and machining according to a seventh embodiment.

FIG. 8 illustrates the cap member 2 before cutting according to a seventh embodiment. FIG. 9 illustrates the cap member 2 after the cutting. Similar to the above-described embodiments, the connector 1 has the projection 11d, and the projection 11*d* of the connector 1 is joined to the cap member 2 by projection welding. During the projection welding, spatter is generated in the spatter generation space γ, which is indicated by the two-dot chain line. The spatter adheres to the connector 1 and the area around the inner hole 2A of the cap member 2.

To cope with it, the edge portion 2A1 of the inner hole 2A of the cap member 2 is cut up to the position of the projection 11*d*, as shown in FIG. 9. In addition, part of the inner portion of the projection 11*d* of the connector 1 is removed by cutting. In other words, the surface layer 30 is removed to provide a spatter-removed structure P1. This removes the spatter, which has adhered to the cap member 2 and the connector 1. Therefore, the spatter does not enter the refrigerating circuit when the refrigerating circuit is actually operated, with the pressure switch being connected to the pipe of the refrigerating circuit.

Figure 10:
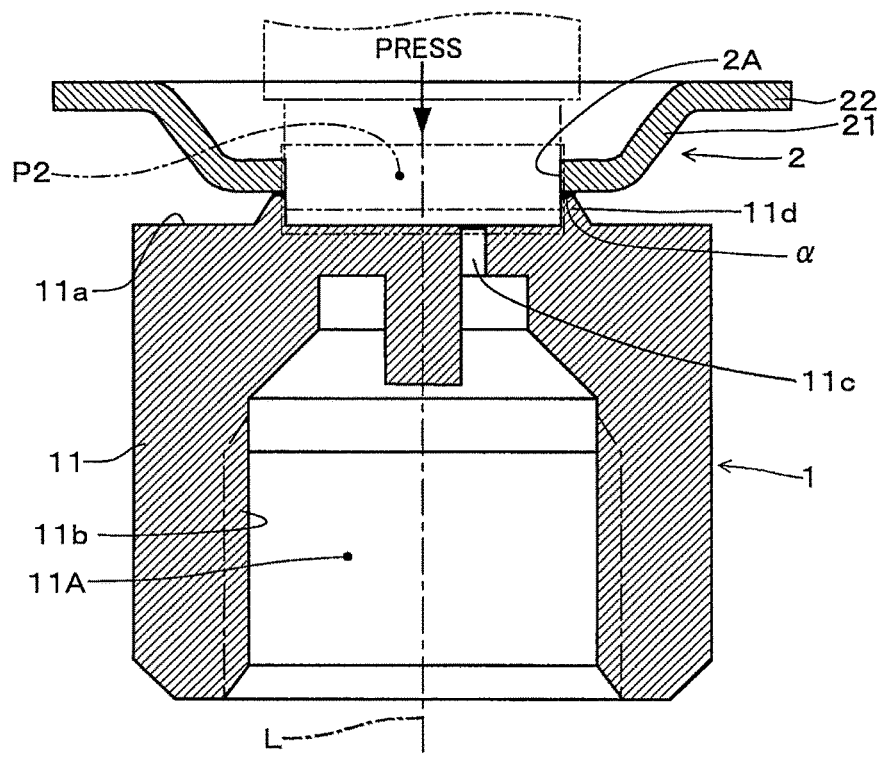
FIG. 10 illustrates the connector and the cap member after welding and machining according to an eighth embodiment.

FIG. 10 illustrates the connector 1 and the cap member 2 after welding and machining according to an eighth embodiment. In the eighth embodiment, the periphery of the inner hole 2A of the cap member 2 and part of the inner portion of the projection 11*d* of the connector 1 are removed by press working. Specifically, part of the surface layer of the cap member 2 and the inner hole 2A of the connector 1 is pressed and the spatter is embedded such that a spatter-removed structure P2 is formed. This removes the spatter, which has adhered to the cap member 2 and the connector 1. Therefore, the spatter does not enter the refrigerating circuit when the refrigerating circuit is actually operated, with the pressure switch being connected to the pipe of the refrigerating circuit.

Figure 11:
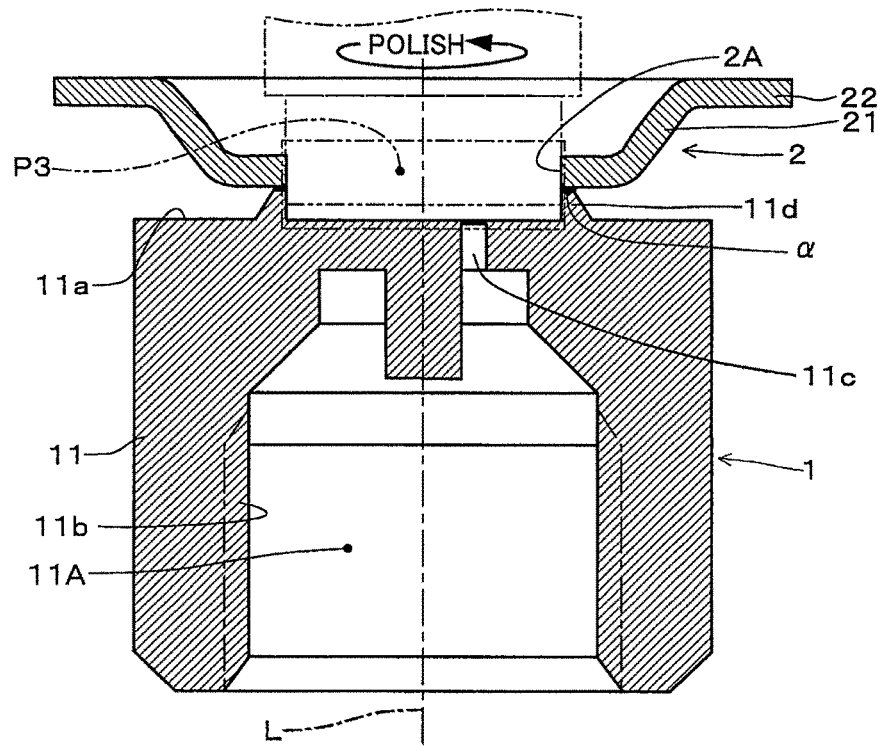
FIG. 11 illustrates the connector and the cap member after welding and machining according to a ninth embodiment.

FIG. 11 shows the connector 1 and the cap member 2 after welding and machining according to a ninth embodiment. In the ninth embodiment, the periphery of the inner hole 2A of the cap member 2 and the inner face of the projection 11*d* of the connector 1 are partially removed by polishing with a polishing element such as a whetstone or grindstone. In other words, the surface layer of the inner hole 2A of the cap member 2 and the connector 1 is partially removed to provide a spatter-removed structure P3. This eliminates the spatter, which adhered to the cap member 2 and the connector 1. Thus, the spatter does not flow into the refrigerant circuit when the refrigerant circuit is actually operated with this pressure switch being connected to the pipe of the refrigerant circuit.

Figure 12:
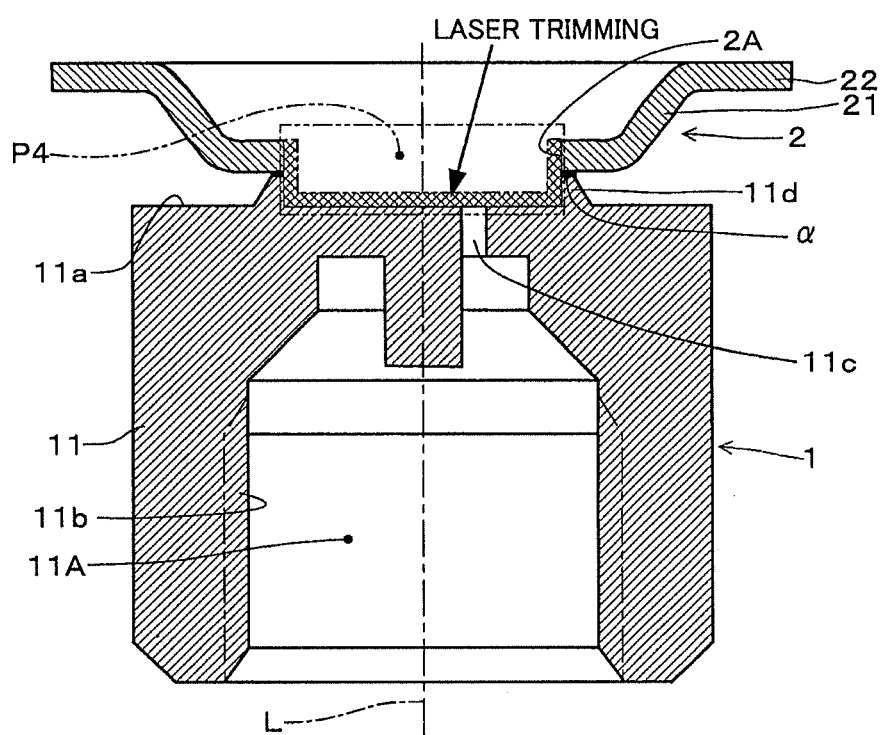
FIG. 12 illustrates the connector and the cap member after welding and machining according to a tenth embodiment.

FIG. 12 illustrates the connector 1 and the cap member 2 after welding and machining according to a tenth embodiment. In the tenth embodiment, the periphery of the inner hole 2A of the cap member 2 and the inner face of the projection 11*d* of the connector 1 are partially removed by laser trimming. In other words, the surface layer of the inner hole 2A of the cap member 2 and the connector 1 is partially removed to provide a spatter-removed structure P4. This eliminates the spatter, which adhered to the cap member 2 and the connector 1. Thus, the spatter does not flow into the refrigerant circuit when the refrigerant circuit is actually operated with this pressure switch being connected to the pipe of the refrigerant circuit.

In the above-described embodiments, the refrigerant circuit component is the pressure switch, which is a "pressure sensitive device." It should be noted that the present invention can be applied to an open-close valve, which is a "valve device." The valve device is an example of the refrigerant circuit component. This will be described in an eleventh embodiment shown in FIG. 13 and in a twelfth embodiment shown in FIG. 14. In the twelfth embodiment, the same or corresponding elements to the eleventh embodiment are assigned the same reference numerals and symbols, and detailed description of such elements is omitted.

Figure 13:
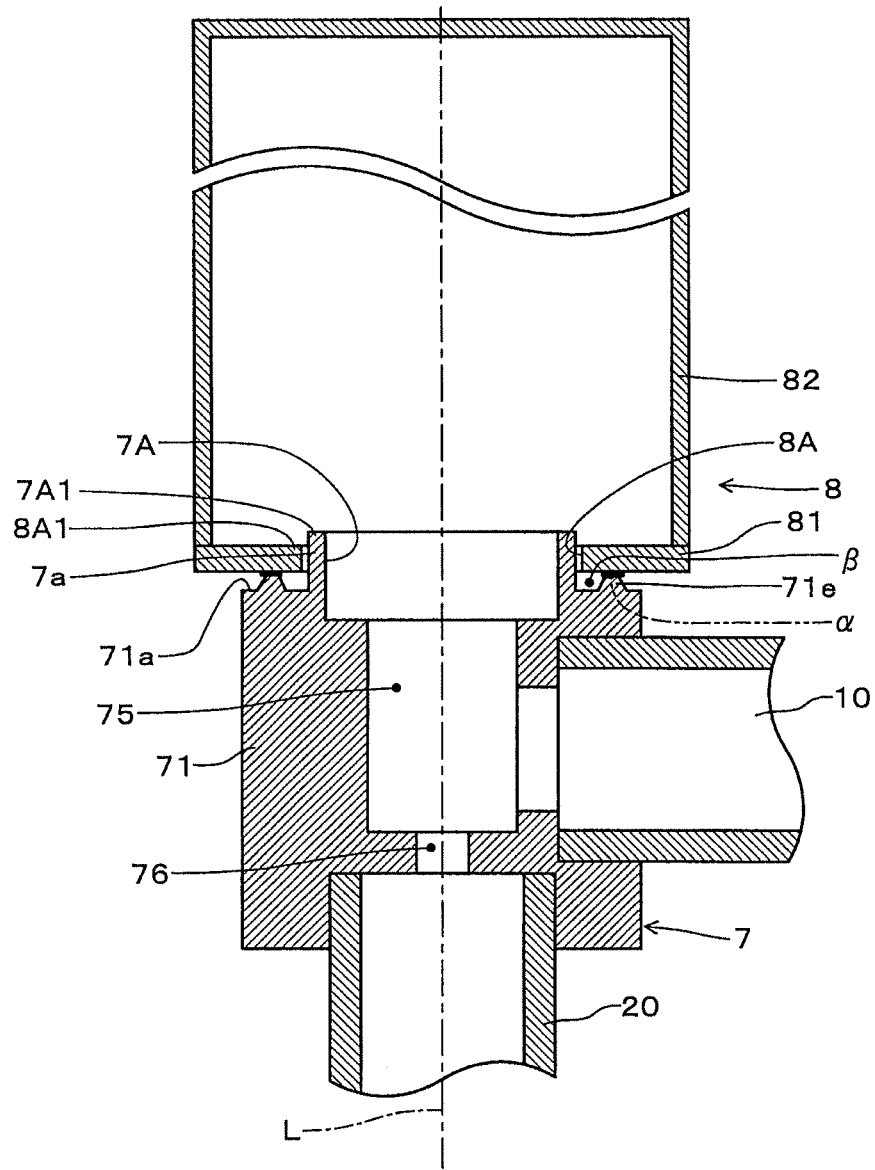
FIG. 13 illustrates the structure of a housing and a part of the casing in an open-close valve according to an eleventh embodiment.

In the eleventh embodiment of FIG. 13, the refrigerant circuit component includes a brass housing 7 and a stainless casing 8. The brass housing 7 is a "copper-based member," and this is one example of the "connecting member." The casing 8 has a circular disc-shaped casing part 81 and a cylindrical casing main body 82. The housing 7 is joined with the casing part 81 by projection welding and crimping. Then, the casing main body 82 is fixedly secured on the casing part 81 by welding or the like. A first coupling tube 10 and a second coupling tube 20 are attached to the housing 7. A valve chamber 75 and a valve port 76 are formed between the coupling tubes 10 and 20. It should be noted that a valve body (not shown) is disposed in the valve chamber, and a drive mechanism and relevant elements (not shown) are disposed in the casing main body 82 to actuate the valve body.

In the eleventh embodiment shown in FIG. 13, the main body 71 of the housing 7 has a flat portion 71*a*, and a projection 71*e* is formed on the flat portion 71*a*. The projection 71*e* is an annular mountain-like "convex portion," and the axial line L extends through the center of the projection 71*e*. The housing 7 includes an A-cylindrical portion 7*a* that has an inner hole 7A. The spatter generation space β is defined between the projection 71*e* and the A-cylindrical portion 7*a*. The projection 71*e* is formed around the A-cylindrical portion 7*a* with a gap being left between the projection 71*e* and the A-cylindrical portion 7*a*.

The A-cylindrical portion 7*a* is received in and extends through the inner hole 8A of the casing part 81, and the projection 71*e* of the housing 7 is joined to the casing 8 by projection welding. As a result, the welded portion α is formed between the projection 71*e* and the casing part 81 as indicated by the phantom line. Then, the opening end 7A1 of the A-cylindrical portion 7*a* is crimped. The crimping may be carried out in a similar manner to the first embodiment. Specifically, the opening end 7A1 may be crimped over the opening end 8A1 of the inner hole 8A of the casing 8. Alternatively, the crimping may be carried out in a similar manner to the third embodiment. Specifically, a load may be applied to the opening end 7A1 in the axial direction to crimp the opening end 7A1. In this way, the opening end 7A1 of the A-cylindrical portion 7*a* is pressure-joined to the opening end 8A1 of the casing part 81 around the inner hole 8A.

In the eleventh embodiment, the spatter generated upon the projection welding is retained in the spatter generation space β, and sealed (confined) in the spatter generating space β as the opening end 7A1 of the A-cylindrical portion 7*a* is crimped. Therefore, the spatter does not enter the refrigerating circuit when the refrigerating circuit is actually operated, with the open-close valve being connected to the pipe of the refrigerating circuit.

Figure 14:
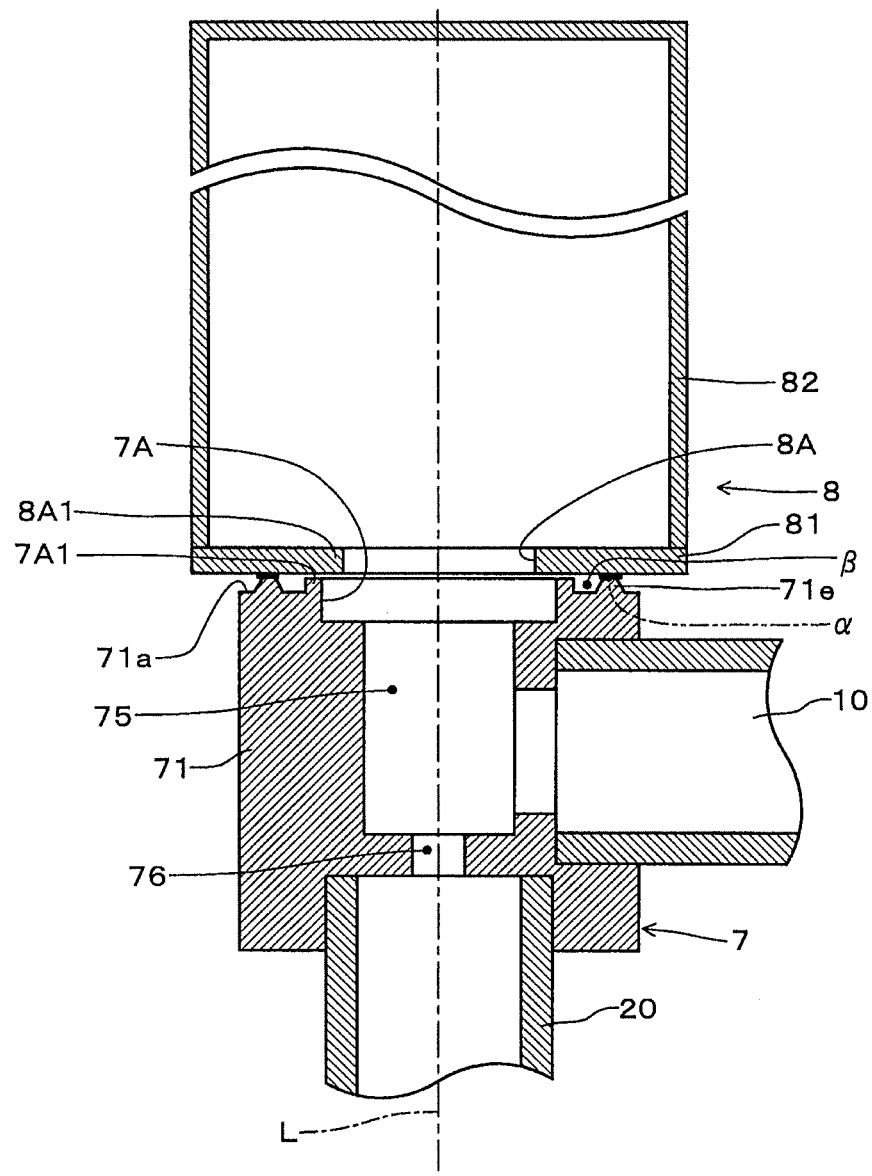
FIG. 14 illustrates the structure of the housing and the part of the casing in the open-close valve according to a twelfth embodiment.

In the twelfth embodiment shown in FIG. 14, the opening end 7A1 of the inner hole 7A is preset inside the projection 71*e* on the flat portion 71*a* of the housing 7. The spatter generation space β is defined between the projection 71*e* and the opening end 7A1. The opening end 8A1 of the inner hole 8A of the casing part 81 faces the opening end 7A1. The welded portion α is formed at an end of the projection 71*e* as indicated by the phantom line. Similar to the fifth embodiment, the opening end 8A1 of the casing part 81 is crimped toward the opening end 7A1 of the housing 7 such that the opening end 8A1 of the casing part 81 is pressure-joined to the opening end 7A1 of the housing 7 around the inner hole 7A1.

In the twelfth embodiment, the spatter generated upon the projection welding is retained in the spatter generation space 3, and sealed in the spatter generating space β as the opening end 8A1 of the casing part 81 is crimped. Therefore, the spatter does not enter the refrigerating circuit when the refrigerating circuit is actually operated, with the open-close valve being connected to the pipe of the refrigerating circuit.

It should be noted that the open-close valve (valve device) in the eleventh or twelfth embodiment may employ a joint structure that is similar to the joint structure described in one of the second embodiment, the fourth embodiment, and the sixth to tenth embodiments. Also, the above-described open-close valve (valve device) may have one of the spatter-removed structures P1-P4 described in the seventh to tenth embodiments shown in FIGS. 8-12.

Figures 15A, 15B:
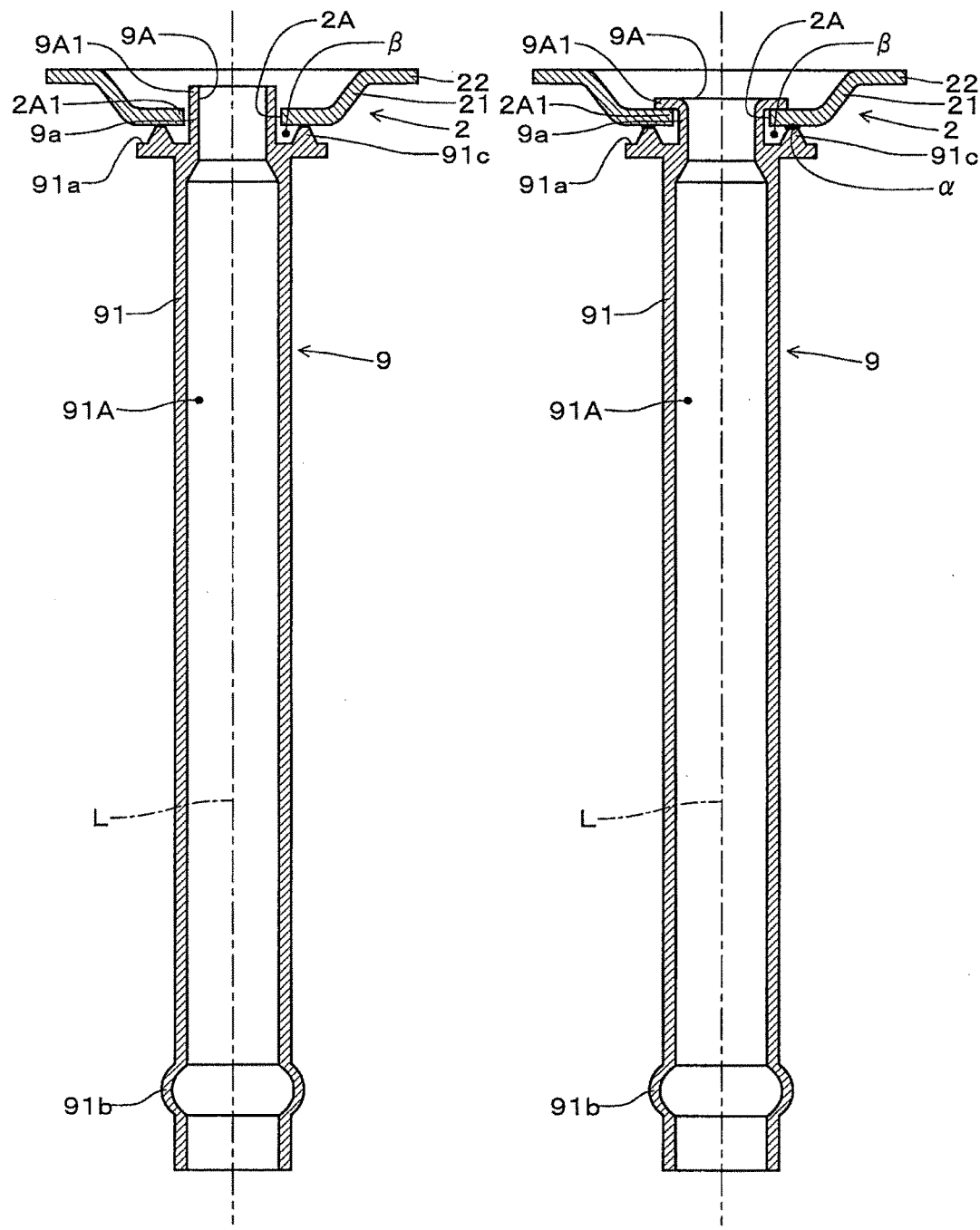
FIG. 15A is a view illustrating a process for joining a copper pipe to the cap member according to a thirteenth embodiment.
FIG. 15B is a view illustrating a process for joining a copper pipe to the cap member according to a thirteenth embodiment.

Although the first to tenth embodiments use the connector 1 as the "connecting member," these embodiments may use a copper tube, i.e., a "copper-based member," as the "connecting member." FIGS. 15A and 15B are a set of views that illustrate a copper tube 9 and the cap member 2 after welding and machining according to a thirteenth embodiment.

FIG. 15A illustrates the copper tube 9 and the cap member 2 prior to the welding, and FIG. 15B illustrates the copper tube 9 and the cap member 2 after welding and crimping. The copper tube 9 has a main body 91, and the main body 91 has a flat portion 91a that faces the cap member 2. The interior of the main body 91 defines a tubular passage 91A. It should be noted that a stopper portion 91b is formed on the main body 91 on the opposite side to the flat portion 91a. The stopper portion 91b is used when connecting to the pipe (not shown). An A-cylindrical portion 9a having a cylindrical shape is formed on the flat portion 91a. The axial line L extends through the center of the A-cylindrical portion 9a. The A-cylindrical portion 9a has the inner hole 9A at its center. The inner hole 9A communicates with the tubular passage 91A. A projection 91c is formed on the flat portion 91a of the copper tube 9. The projection 91c has an annular mountain-like shape, and the axial line L extends through the center of the projection 91c. The projection 91c is a "convex portion." The projection 91c is spaced from the A-cylindrical portion 9a. The spatter generation space β is defined between the projection 91c and the A-cylindrical portion 9a.

The A-cylindrical portion 9a of the copper tube 9 is received in and extends through the inner hole 2A of the cap member 2, with a gap being left between the A-cylindrical portion 9a and the inner hole 2A. The projection 91c of the copper tube 9 is joined to the cap member 2 by projection welding. As a result, as shown in FIG. 15B, the welded portion α is formed between the projection 91c and the cap member 2. A load is applied on the opening end 9A1 of the A-cylindrical portion 9a outward relative to the axial line L to crimp the opening end 9A1. Thus, the opening end 9A1 of the A-cylindrical portion 9a is pressure-joined to the opening edge 2A1 of the cap member 2 around the inner hole 2A.

In the thirteenth embodiment, the spatter generated upon the projection welding is retained in the spatter generation space β, and sealed in the spatter generating space β as the opening end 9A1 of the A-cylindrical portion 9a is crimped. Therefore, the spatter does not enter the refrigerating circuit when the refrigerating circuit is actually operated, with the pressure switch being connected to the pipe of the refrigerating circuit.

When the copper tube 9 is used as in the thirteenth embodiment, the joint structure described in any one of the second to tenth embodiments may be employed. Also, such copper tube 9 may have one of the spatter-removed structures P1-P4 of the seventh to tenth embodiments described with reference to FIGS. 8-12.

In the first embodiment (FIGS. 2A and 2B), the second embodiment (FIGS. 3A and 3B), the third embodiment (FIGS. 4A and 4B), and the sixth embodiment (FIGS. 7A and 7B), even if a force is applied to separate the connector 1 from the cap member 2 at the welded portion, the crimped portion exerts the resistance force. Thus, the rigidity of the welded portion is enhanced.

In the first to tenth embodiments, the pressure switch is used as the example of the "pressure sensitive device." It should be noted that a pressure sensor can have the connector 1 and the cap member 2 that have the same structure as the first to tenth embodiments. The present invention can be applied to the pressure sensor, which is one example of the "pressure sensitive device."

REFERENCE NUMERALS AND SYMBOLS

1: Connector (connecting member)
1a: A-cylindrical portion
1A: Inner hole
1A1: Opening end
2: Cap member (casing part)
2a: B-cylindrical portion
2A: Inner hole
2A1: Opening end
L: Axial line
α: Welded portion
β: Spatter generation space
11d: Projection
P1: Spatter-removed structure
P2: Spatter-removed structure
P3: Spatter-removed structure
P4: Spatter-removed structure
7: Housing (connecting member)
71e: Projection
7A: Inner hole
7a: A-cylindrical portion
7A1: Opening end
81: Casing part
8A: Inner hole
8A1: Opening end
9: Copper pipe (connecting member)
9a: A-cylindrical portion
9A: Inner hole
9A1: Opening end
91c: Projection

The invention claimed is:

1. A joining method for use with a refrigerant circuit component, the refrigerant circuit component including a connecting member and a casing part, which are joined to each other by projection welding, the connecting member having an inner hole connected to a pipe of a refrigerant circuit, and the casing part having an inner hole that communicates with the pipe via the inner hole of the connecting member, the joining method comprising:

joining the casing part with the connecting member by projection welding such that a welded portion extends around an entire outer periphery of the inner hole of the casing part with a first gap being left between the welded portion and the inner hole of the casing part, and such that the welded portion extends around an entire outer periphery of the inner hole of the connecting member with a second gap being left between the welded portion and the inner hole of the connecting member; and crimping an opening end of one of the casing part and the connecting member around the inner hole thereof toward an opening end of the other of the casing part and the connecting member around the inner hole thereof to pressure-join the opening ends of the casing part and the connecting member and seal a spatter generation space inside the welded portion.

2. The joining method of claim 1 wherein the connecting member includes a flat portion and an annular projection that extends outwardly from the flat portion and is radially spaced from the inner hole of the connecting member, and wherein the step of joining the casing part with the connecting member includes welding the casing part and the connecting member at the projection, and wherein the spatter generation space is defined between the projection and the inner hole.

3. The joining method of claim 2 wherein the casing part inner hole is defined by an opening end of the casing part, and the opening end of the casing part extends radially inwardly beyond the projection but does not engage the connecting member during the projection welding step.

\* \* \* \* \*